United States Patent
Yoon (10) Patent No.: US 11,197,582 B2
(45) Date of Patent: Dec. 14, 2021

(54) VERTICAL ROLLER-TYPE GRINDING BLADE AND GRINDER INCLUDING SAME

(71) Applicant: Hyuk Beom Yoon, Ansan-Si (KR)

(72) Inventor: Hyuk Beom Yoon, Ansan-Si (KR)

(73) Assignee: Hyuk Beom Yoon, Ansan-Si (KR)

( * ) Notice: Subject to any disclaimer, the term of this patent is extended or adjusted under 35 U.S.C. 154(b) by 115 days.

(21) Appl. No.: 16/612,815

(22) PCT Filed: Mar. 26, 2018

(86) PCT No.: PCT/KR2018/003502
§ 371 (c)(1),
(2) Date: Nov. 12, 2019

(87) PCT Pub. No.: WO2018/212445
PCT Pub. Date: Nov. 22, 2018

(65) Prior Publication Data
US 2020/0197946 A1    Jun. 25, 2020

(30) Foreign Application Priority Data
May 19, 2017  (KR) .......................... 10-2017-0062383

(51) Int. Cl.
*A47J 42/32* (2006.01)
*A47J 42/36* (2006.01)
(Continued)

(52) U.S. Cl.
CPC .............. *A47J 42/32* (2013.01); *A47J 42/36* (2013.01); *B02C 4/08* (2013.01); *B02C 4/10* (2013.01); *B02C 4/30* (2013.01); *B02C 4/42* (2013.01)

(58) Field of Classification Search
CPC .............. A47J 42/00; A47J 42/32; A47J 42/36
See application file for complete search history.

(56) References Cited

U.S. PATENT DOCUMENTS 1,760,755 A * 5/1930 Hertz ...................... A47J 42/06
                                                                  241/32
1,969,899 A * 8/1934 Nielsen .................. A47J 42/16
                                                                  241/32
(Continued)

FOREIGN PATENT DOCUMENTS

JP     H05-184467 A     7/1993
JP     2002-263011 A    9/2002
(Continued)

OTHER PUBLICATIONS

International Search Report issued in corresponding International Application No. PCT/KR2018/003502 dated Aug. 30, 2018 (2 pages).

(Continued)

*Primary Examiner* — Faye Francis
(74) *Attorney, Agent, or Firm* — Osha Bergman Watanabe & Burton LLP (57) ABSTRACT

The present invention provides a system for a vertical roller grinding blade and a grinder including the same, the blade including an outer blade having a hollow space formed therein; and an inner blade which can be installed to be rotated by a rotating shaft in the hollow space of the outer blade and includes at least two eccentric rollers installed to each other such that a center line and a rotation axis of each of the at least two eccentric rollers are misaligned and eccentric to each other, wherein the center lines of the at least two eccentric rollers are misaligned and eccentric to each other.

10 Claims, 8 Drawing Sheets

(51) Int. Cl.
*B02C 4/08* (2006.01)
*B02C 4/30* (2006.01)
*B02C 4/42* (2006.01)
*B02C 4/10* (2006.01)

(56) References Cited

U.S. PATENT DOCUMENTS

| | | | | |
|---|---|---|---|---|
| 2,182,131 | A | * | 12/1939 | Maede .................... A47J 42/36 241/143 |
| 2,323,771 | A | * | 7/1943 | Hazle, Jr. ................ A47J 42/36 241/10 |
| 2,407,808 | A | | 9/1946 | Bivans |
| 2,576,299 | A | * | 11/1951 | Knapp .................... A47J 31/42 241/245 |
| 4,815,671 | A | * | 3/1989 | Akira ...................... A47J 42/04 241/101.8 |
| 5,865,383 | A | * | 2/1999 | Ford ....................... A47J 42/40 241/36 |
| 6,412,405 | B1 | * | 7/2002 | Li ........................... A23N 5/002 241/259.1 |
| 6,966,507 | B2 | | 11/2005 | Yang |
| 8,677,894 | B2 | * | 3/2014 | Turgeman ............... B02C 18/30 99/510 |
| 2013/0034643 | A1 | | 2/2013 | Turgeman et al. |
| 2014/0361107 | A1 | * | 12/2014 | Steiner ................... A47J 42/18 241/253 |

FOREIGN PATENT DOCUMENTS

| | | |
|---|---|---|
| JP | 2014-528703 A | 10/2014 |
| KR | 10-2010-0062386 A | 6/2010 |
| KR | 10-2012-0004004 A | 1/2012 |

OTHER PUBLICATIONS

Written Opinion issued in corresponding International Application No. PCT/KR2018/003502 dated Aug. 30, 2018 (5 pages).
Office Action issued in corresponding Korean Application No. 10-2017-0062383 dated May 13, 2018, and English translation thereof (7 pages).
Extended European Search Report issued in corresponding European Application No. 18803003.5, dated Oct. 15, 2020 (7 pages).

* cited by examiner

COFFEE BEAN

[Fig.5]

COFFEE BEAN

VERTICAL ROLLER-TYPE GRINDING BLADE AND GRINDER INCLUDING SAME

TECHNICAL FIELD

The present invention relates to a grinder used to grind coffee beans or the like, and more specifically to a vertical roller-type grinding blade, in which at least two eccentric rollers are arranged in a vertical direction and a center line and a rotation line of each eccentric roller are eccentrically disposed to be misaligned with each other so that a compression force is applied to a grinding object and the grinding object is ground due to eccentric rotation of the eccentric rollers when the grinding object proceeds in a downward direction, and a grinder including the same.

BACKGROUND ART

In order to extract coffee, first, coffee beans should be ground using a coffee bean grinder. The coffee bean grinder is generally classified into an electric grinder and a manual grinder according to use of a motor, and is classified into a rotating blade type grinder, a burr type grinder, and a roller type grinder according to the manner of grinding. The burr type grinder is generally used in the manual grinder and the electric grinder, and generally grinds the coffee beans by fixing one of two grinding blades adjusted at a desired interval and rotating the other one, and allowing the coffee beans to pass through a space between the two grinding blades. The rotating blade type grinder is used in a small and low cost electric grinder, and generally grinds the coffee beans by colliding one rotating blade which quickly rotates with the coffee bean several times in an enclosed space. The roller type grinder is limitedly used in a large electric grinder due to horizontally arranged rollers, and grinds the coffee beans using a pressure generated when the coffee beans pass through a pair of rollers or more.

The burr type grinder includes an input part into which the coffee beans are input, grinding blades configured to ground the coffee beans, a shaft connected to the grinding blades to rotate the grinding blades, a thickness adjusting device configured to adjust an interval of the grinding blades, and a discharge part configured to receive the ground coffee beans or collect the coffee beans at a specific position. In the manual burr type grinder, generally, a shaft crosses an input part located at the top of the grinder, and a handle configured to rotate grinding blades is connected to the shaft. The electric burr type grinder generally has a structure in which the shaft moves downward or horizontally so that a heavy motor can be located at a lower portion.

A flat burr in which cutting protrusions are formed in facing directions of two flat circular blades, and a conical burr in which cutting protrusions are formed on an outer circumferential surface of a conical inner blade and an inner circumferential surface of a cylindrical outer blade are formed are used for the grinding blades of the burr type grinder. In the case of the conical burr widely used for a portable manual grinder to an electric grinder, a first cutting surface on which spiral cutting protrusions are provided is formed on the inner blade, and a second cutting surface on which cutting protrusions are relatively densely formed in comparison with the first cutting surface is formed under the first cutting surface. The outer blade includes a first corresponding cutting surface corresponding to the first cutting surface and a second corresponding cutting surface corresponding to the second cutting surface in a cylindrical body inner circumferential surface, and cutting protrusions are also densely formed on the second corresponding cutting surface. The coffee beans are primarily ground while passing through a space between the first cutting surface and the first corresponding cutting surface, and are finely ground in a desired particle size while passing through a space between the second cutting surface and the second corresponding cutting surface.

Meanwhile, recently, there is an increasing demand for grinding coffee beans with small friction to improve a taste and a smell of coffee. That is, since frictional heat generated while grinding the coffee beans volatilizes volatile ingredients in the coffee beans and thus reduces the taste and the smell of the coffee, a method of reducing a frictional force applied to the coffee beans has been demanded. For grinding with reduced friction, optimizing a grinding speed, improvement of a material constituting grinding blades and surface treatment of the grinding blades, finely optimizing the shape and processing of the grinding blades are mainly performed. Further, since the burr type grinder has a characteristic in which the thickness and uniformity of ground products are influenced by an interval of the grinding blades, a finely adjusting and correctly maintaining structure of the interval of the grinding blades is also demanded.

However, grinding blades having a structure in which friction is reduced by reducing grinding sections by cutting surfaces which cause friction in the burr type grinder are not known, and although a roller type grinder configured to reduce friction by minimizing a cutting surface has been already used, since the structure is complicated and adjusting a grinding grade is difficult due to an installation space of horizontal rollers and arrangement of a motor driving part for driving the horizontal rollers, the roller type grinder can be used in a large grinder operated by skilled workers. Further, it is difficult for a high performance stepless thickness adjusting device capable of finely adjusting and maintaining an interval of the grinding blades in the burr type grinder to be implemented in a portable manual grinder due to a complicated structure using a worm gear or a wedge and a spring.

DISCLOSURE

Technical Problem

The present invention is directed to providing a vertical roller-type grinding blade including an inner blade having at least two eccentric rollers which are eccentrically disposed in a vertical direction to provide a compression force to a grinding object such as a coffee bean so that the grinding object is ground.

Further, the present invention is directed to providing a vertical roller-type grinding blade capable of minimizing the application of a frictional force to a grinding object such as a coffee bean during a process of grinding the grinding object.

In addition, the present invention is directed to providing a grinder in which adjustment of an interval between an outer blade and an inner blade configured to adjust a thickness of a grinding object may be simply performed and reliably maintained.

In addition, the present invention is directed to providing a grinder in which it is easy to clean grinding blades.

Technical Solution

One aspect of the present invention provides a vertical roller-type grinding blade including: an outer blade having a hollow hole formed therein; and an inner blade including at least two eccentric rollers installed in the hollow hole of the outer blade to be rotated by a rotating shaft, each eccentric roller being eccentrically installed so that a center line and a rotation axis are misaligned with each other, wherein the eccentric rollers are eccentrically installed to each other so that center lines of the eccentric rollers are misaligned with each other.

According to an embodiment of the present invention, the eccentric rollers may include a first eccentric roller located at an upper side and a second eccentric roller located at a lower side of the first eccentric roller, and a portion having the greatest interval between an outer circumferential surface of the second eccentric roller and an inner circumferential surface of the hollow hole may be formed to be wider than a portion having the smallest interval between an outer circumferential surface of the first eccentric roller and the inner circumferential surface of the hollow hole.

According to the embodiment of the present invention, the second eccentric roller, which is installed at a lower side among the eccentric rollers, may be formed to have a diameter greater than or equal to that of the first eccentric roller located at an upper side.

According to the embodiment of the present invention, the eccentric roller may include a bearing part configured to rotate together with the rotating shaft fixed to the inner blade, and a ring part rotatably supported on the bearing part, and an interval between an outer circumferential surface of the ring part and the inner circumferential surface of the hollow hole of the outer blade may be variable while the ring part maintains a non-rotating state when the bearing part rotates.

According to the embodiment of the present invention, a slip prevention part may be formed in at least one of the outer circumferential surface of the eccentric roller and the inner circumferential surface of the hollow hole, and the slip prevention part may be a slip prevention groove formed in a direction which crosses a radial direction in the outer circumferential surface of the eccentric roller or the inner circumferential surface of the hollow hole.

According to the embodiment of the present invention, the outer blade may include a cutting surface in which a cutting protrusion is formed on an inclined surface thereof which extends downward to be inclined in an outward direction at a lower end of the inner circumferential surface of the hollow hole, and the inner blade may include a corresponding cutting surface on which a cutting protrusion is formed to correspond to the cutting surface in an outer circumferential surface under the eccentric rollers and may further include a cutting blade in which a center line and a rotation axis are correspondingly installed.

Further, another aspect of the present invention provides a grinder including: a hollow body in which the vertical roller-type grinding blade is installed; a driving part including the rotating shaft coupled to the inner blade to extend upward from the body and a driving means configured to rotate the rotating shaft; a particle size adjusting plate rotatably coupled to a height adjusting screw part formed at an upper portion of the body, and in which the rotating shaft passes therethrough and is supported in a height direction due to the rotating shaft passing therethrough to adjust a height of each of the rotating shaft and the inner blade fixed to the rotating shaft, and screw holes are formed in a surface thereof; a fixing plate rotatably coupled to the height adjusting screw part, and having screw holes corresponding to the screw holes of the particle size adjusting plate in a surface thereof; and particle size fixing screws fastened through the screw holes in a state in which the screw holes of the particle size adjusting plate and the screw holes of the fixing plate correspond to each other to press the particle size adjusting plate and the fixing plate so that the particle size adjusting plate and the fixing plate receive forces in facing directions.

In addition, still another aspect of the present invention provides a grinder including: a hollow body in which the vertical roller-type grinding blade is installed at a lower portion; a driving part including the rotating shaft coupled to the inner blade to extend upward from the body and a driving means configured to rotate the rotating shaft; a particle size adjusting plate rotatably coupled to a height adjusting screw part formed at an upper portion of the body, and configured to adjust a height of the inner blade coupled to the rotating shaft by rotating along the height adjusting screw part as the rotating shaft is supported in a height direction; and a shaft height fixing member fitted into a through hole formed in a center portion of the particle size adjusting plate in a downward direction to be detachably fixed, and in which the rotating shaft passes therethrough and is supported in the height direction to regulate a height of the rotating shaft.

According to the embodiment of the present invention, an inner circumferential surface of the body may be further provided with a partition configured to protrude inward along a circumference thereof, and thus an inner space of the body may be divided into an upper section on the partition in which a grinding object is introduced and stored, and a lower section under the partition on which the outer blade of the grinding blade is supported, a through hole configured to allow the grinding object to move and a through hole formed in the center portion so that the rotating shaft extends therethrough may be formed in the partition, and a descending range of the shaft height fixing member and the rotating shaft to which the inner blade is fixed may be regulated by the partition around the through hole when the shaft height fixing member is separated from the particle size adjusting plate and descends.

Advantageous Effects

In a vertical roller-type grinding blade according to the present invention, a grinding object can receive a compression force and be ground with minimum frictional heat by rotation of an inner blade including at least two eccentric rollers which are vertically disposed.

Further, since a grinding space is formed between outer circumferential surfaces of the eccentric rollers forming the inner blade and an inner circumferential surface of a hollow hole of an outer blade, and thus a blade configured to protrude from the inner circumferential surface of the outer grinding blade is not necessary to be formed, processing is easy and a thickness of a wall of the outer blade can be minimized, and thus weight and cost can be reduced.

In addition, in the grinding blade, since a grinding space is formed between the outer circumferential surfaces of the eccentric rollers and the inner circumferential surface of the hollow hole of the outer blade, and the grinding object receives a compression force in a radial direction, a popping phenomenon in which the grinding object pops out can be minimized in comparison with a known conical inner blade.

In addition, the eccentric rollers forming components of the grinding blade is easy to be manufactured in comparison with those in the conical inner blade.

In addition, since the inner blade is formed as assembly of the eccentric rollers and cutting rollers, separate repair and adjustment are easy.

In a grinder according to the present invention, adjusting an interval between the outer blade and the inner blade to adjust a thickness of grinding object can be performed in a simple way, and the interval can be correctly and stably maintained without backlash by a simple operation of a particle size adjusting screw.

Further, the grinding blade can be easily cleaned.

MODES OF THE INVENTION

Hereinafter, embodiments of the present invention will be described in detail with reference to the accompanying drawings.

Figure 1:
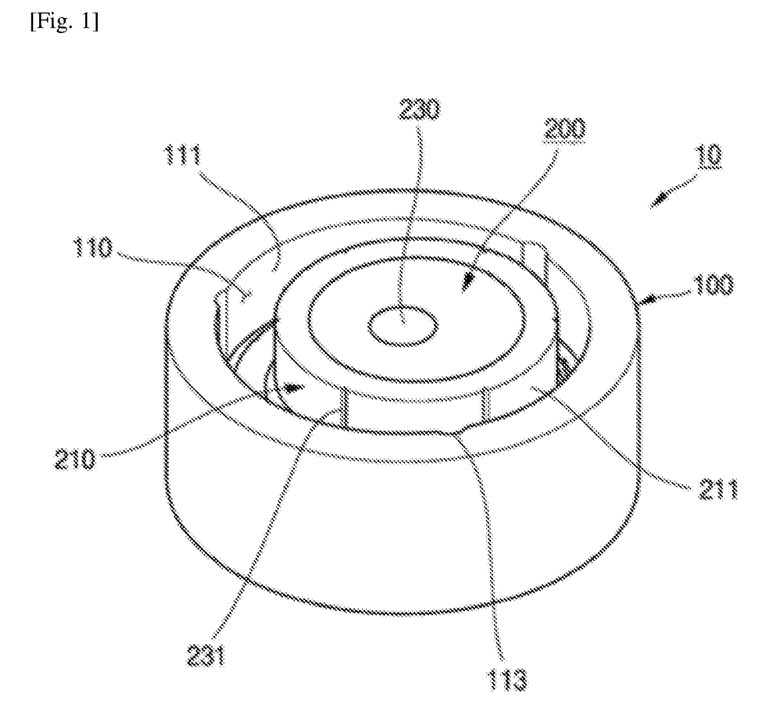
FIG. 1 is a perspective view of a vertical roller-type grinding blade according to the present invention.
Figure 2:
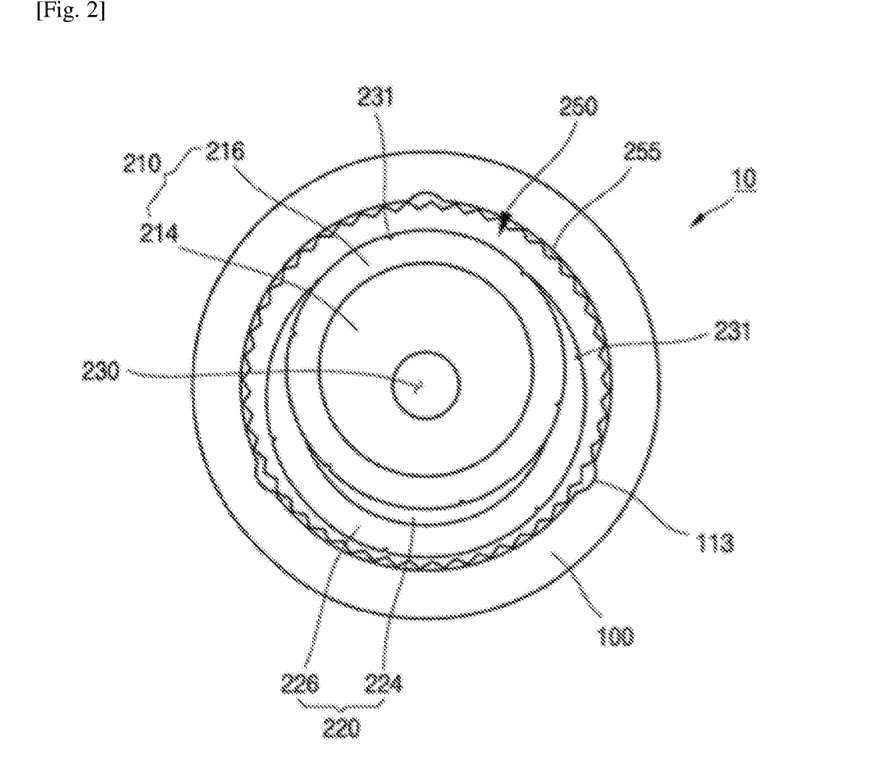
FIG. 2 is a plan view of the vertical roller-type grinding blade according to the present invention.
Figure 3:
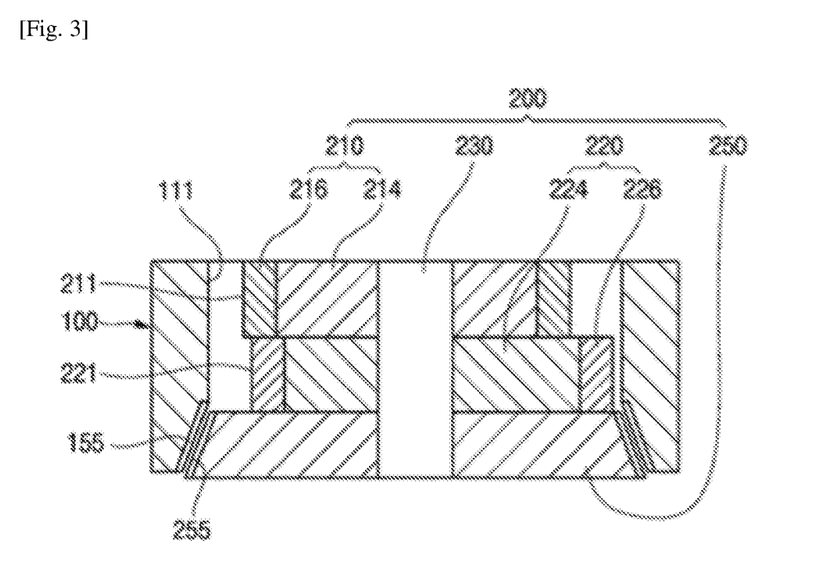
FIG. 3 is a cross-sectional view of the vertical roller-type grinding blade according to the present invention.

FIGS. 1 to 3 are a perspective view, a plan view, and a cross-sectional view of a vertical roller-type grinding blade according to an embodiment of the present invention, respectively.

As shown in the drawings, a grinding blade 10 according to the present invention includes an outer blade 100 and an inner blade 200.

The outer blade 100 has a cylindrical body having a hollow hole 110, and the inner blade 200 is disposed in the hollow hole 110. A grinding object such as a coffee bean or the like is ground by relative movement between an outer circumferential surface of the inner blade 200 and an inner circumferential surface of the outer blade 100.

The inner blade 200 includes at least two eccentric rollers 210 and 220. Further, according to an embodiment, the inner blade 200 includes at least two eccentric rollers 210 and 220 and a cutting blade 250. In the embodiment, the inner blade 200 includes two eccentric rollers 210 and 220 and the cutting blade 250, and the two eccentric rollers 210 and 220 and the cutting blade 250 are sequentially disposed in a downward direction.

In the specification, when referring to the two eccentric rollers 210 and 220 separately, the eccentric roller located at an upper side is referred to as a first eccentric roller 210, and the eccentric roller installed at a lower side, under the first eccentric roller 210, is referred to as a second eccentric roller 220.

Looking at the eccentric rollers 210 and 220, a rotating shaft 510 is eccentrically installed in the eccentric rollers 210 and 220 so that a rotation axis is misaligned with center lines of the eccentric rollers. To this end, a rotating shaft hole 230 to which the rotating shaft 510 is coupled is formed in the eccentric rollers 210 and 220 at a position misaligned with centers of the eccentric rollers 210 and 220, and the rotating shaft 510 configured to rotate the grinding blade 10 is installed through the rotating shaft hole 230.

Further, the at least two eccentric rollers 210 and 220 provided in the inner blade 200 are vertically disposed to be assembled with misaligned center lines thereof, that is, in a non-concentric relationship.

In the specification, the center line is a virtual line passing through geometric center of each eccentric roller, and the rotation axis is a virtual line which extends along the center of the rotating shaft hole and passes through a rotation center.

Since the eccentric rollers 210 and 220 are eccentrically disposed, when the eccentric rollers 210 and 220 are rotated in the hollow hole 110 of the outer blade 100 by the rotating shaft 510, an interval between each of outer circumferential surfaces 211 and 221 of the eccentric rollers 210 and 220 and an inner circumferential surface 111 of the outer blade 100 continuously changes.

A space between the outer circumferential surfaces 211 and 221 of the eccentric rollers 210 and 220 and the inner circumferential surface 111 of the outer blade 100 becomes a space in which the grinding object is introduced and ground. While repeating a change in which a grinding space at specific positions in the grinding space becomes broader and narrower according to the eccentric rotation of the eccentric rollers 210 and 220, the grinding object may be introduced into the grinding space and ground. When the grinding space becomes narrower due to the eccentric rotation of the eccentric rollers 210 and 220, the grinding object in the grinding space receives a compression force in a radial direction by the outer circumferential surfaces of the eccentric rollers 210 and 220. That is, the grinding object may receive the compression force and be ground by the grinding blade 10 according to the present invention.

According to the present invention, in the eccentric rollers 210 and 220, the eccentric roller located at a lower side in a height direction is formed to have a diameter greater than or equal to that of the eccentric roller located at an upper side, and according to the embodiment, the eccentric roller located at the lower side may have a relatively greater diameter. In the embodiment, the second eccentric roller 220 has a greater diameter in comparison with the first eccentric roller 210.

Further, according to the present invention, a portion having the greatest interval between the outer circumferential surface of the lower eccentric roller and the inner circumferential surface 111 of the outer blade 100 may be formed to be wider than a portion having the smallest interval between the outer circumferential surface of the upper eccentric roller and the inner circumferential surface 111 of the outer blade 100.

Referring to FIG. 3, in the embodiment of the present invention, the first and second eccentric rollers 210 and 220 are eccentrically disposed so that a portion having the greatest interval between the outer circumferential surface 221 of the second eccentric roller 220 and the inner circumferential surface 111 of the outer blade 100 may be formed to be wider than a portion having the smallest interval between the outer circumferential surface 211 of the first eccentric roller 210 and the inner circumferential surface 111 of the outer blade 100. Due to the arrangement of the eccentric rollers 210 and 220, the grinding object ground in the grinding space of the side of the first eccentric roller 210 may be more quickly guided to the grinding space of the side of the second eccentric roller 220 and ground.

In this case, when the portion having the greatest interval between the outer circumferential surface 221 of the second eccentric roller 220 and the inner circumferential surface 111 of the hollow hole 110 of the outer blade 100 is disposed to be located adjacent to the portion having the smallest interval between the outer circumferential surface 211 of the first eccentric roller 210 and the inner circumferential surface 111 of the hollow hole 110 of the outer blade 100, the grinding object may be quickly guided to a lower direction by gravity.

Meanwhile, the arrangement in which the center lines of the eccentric rollers 210 and 220 are misaligned allows a center of gravity of the inner blade 200 to be more easily adjusted and thus, overall, is advantageous for reducing noise and adjusting the balance of the inner blade 200.

According to the embodiment of the present invention, the eccentric rollers 210 and 220 include bearing parts 214 and 224 that are integrally fixed to the rotating shaft 510 and rotate with the rotating shaft 510, and ring parts 216 and 226 rotatably supported on outer circumferential surfaces of the bearing parts 214 and 224. Since the ring parts 216 and 226 are rotatably supported on the basis of the bearing parts 214 and 224, when the grinding object is interposed between the outer circumferential surfaces 211 and 221 of the ring parts 216 and 226 and the inner circumferential surface 111 of the hollow hole 110, the ring parts 216 and 226 stop or minimize rotation to compress and grind the grinding object even when the bearing parts 214 and 224 are rotated by the rotating shaft 510. That is, it is advantageous for minimizing heat received, by the grinding object due to frictional heat and grinding the grinding object.

Figure 4:
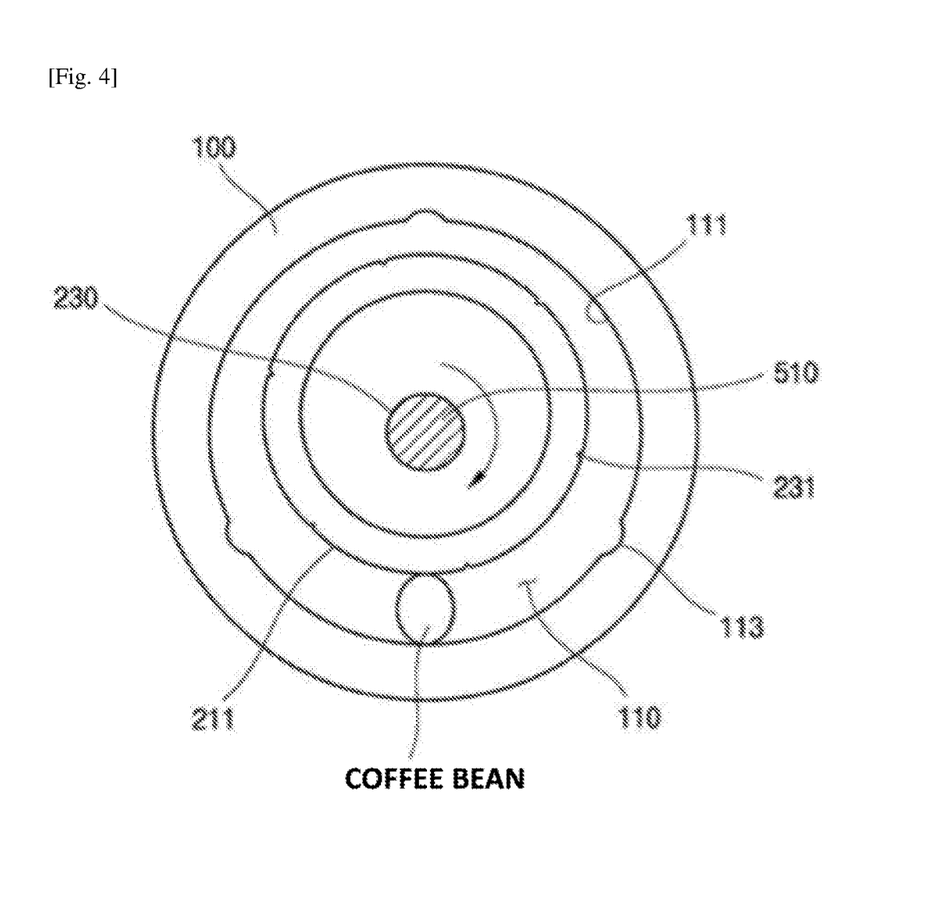
FIGS. 4 and 5 are views for describing an operation in which a grinding object receives a compression force and is ground due to the eccentric rotation of eccentric rollers in the vertical roller-type grinding blade according to the present invention.
Figure 5:
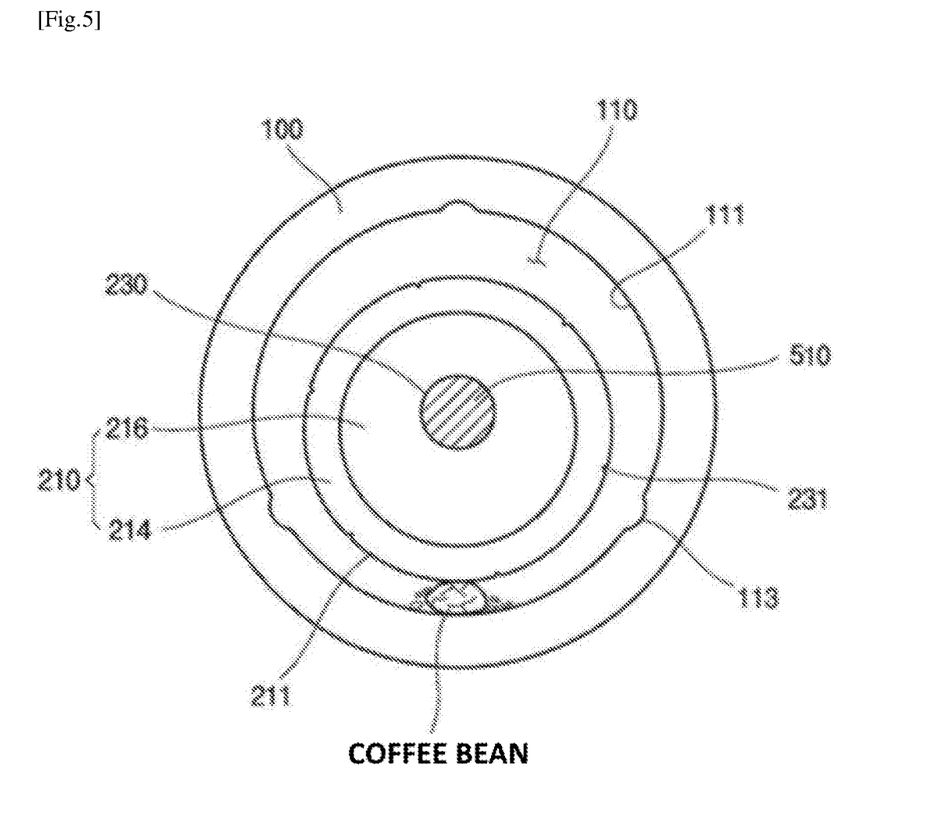

FIGS. 4 and 5 are views for describing an operation in which the grinding object receives the compression force and is ground due to the eccentric rotation of the eccentric rollers in the vertical roller-type grinding blade according to the present invention.

Referring to the drawings, when coffee beans are interposed in a relatively broad grinding space between the outer circumferential surface 211 of the ring part 216 of the first eccentric roller 210 and the inner circumferential surface 111 of the hollow hole 110 (see FIG. 4), since the coffee beans interfere with the rotation of the ring part 216, the bearing part 214 rotates but the ring part 216 does not rotate even when the eccentric roller 210 receives a rotational driving force due to the rotating shaft 510. In this state, when the first eccentric roller 210 rotates due to the rotation of the rotating shaft 510, since the first eccentric roller 210 eccentrically rotates, an interval between the outer circumferential surface of the ring part 216 and the inner circumferential surface 111 of the hollow hole 110 at the portion in which the coffee beans are interposed becomes narrower (see FIG. 5). Accordingly, the coffee beans receive the compression force in the radial direction and then are ground.

In this case, slip prevention grooves 113 and 231 configured to prevent slipping of the grinding object may be formed in the outer circumferential surfaces 211 and 221 of the eccentric rollers 210 and 220 and/or the inner circumferential surface 111 of the hollow hole 110. The slip prevention grooves 113 and 231 are slip prevention parts provided to prevent a case in which the coffee beans interposed between the ring parts 216 and 226 and the inner circumferential surface 111 of the hollow hole 110 do not receive the compression force in a stopped state, but slip while rotating with the ring parts 216 and 226.

The slip prevention part is not limited to the slip prevention groove, and may be formed in various ways such as a protrusion, a lattice pattern, or the like, but the slip prevention groove is advantageous in terms of processing.

Looking specifically at the action of the slip prevention parts, for example, when the coffee beans are interposed between the outer circumferential surface 211 of the ring part 216 of the first eccentric roller 210 and the inner circumferential surface 111 of the hollow hole 110 of the outer blade 100, in some cases, the ring part 216 rotates with the bearing part 214 and the coffee beans may also move with the ring part 216 along the inner circumferential surface 111 of the hollow hole 110. However, when the slip prevention part such as the slip prevention grooves 113 and 231 are formed as in the present embodiment, since the coffee beans are caught in the slip prevention grooves and a slip moving state is stopped, the coffee beans may stop moving and compression grinding of the coffee beans may be performed. In this way, the slip prevention parts such as the slip prevention grooves prevent the occurrence of an abnormal state in which the grinding object slips in the grinding space to allow the grinding object to be stably ground by the grinding blade.

With regard to the coffee beans, it is known that grinding while minimizing the generation of heat during grinding improves the taste and smell of the extracted coffee. Like the embodiment, in the case in which the eccentric rollers are formed of the bearing parts and the ring parts, since the ring part may not rotate when the grinding object is introduced into the grinding space, the grinding space repeatedly decreases and increases in a radial direction while the eccentric rollers eccentrically rotate, and thus the coffee beans are compressed and ground. That is, frictional heat generated while grinding the coffee beans may be minimized to minimize volatilization of volatile ingredients in the coffee bean due to the frictional heat.

Further, the coffee beans have a porous structure, and pores may be advantageous for the taste and smell of the coffee when maintained while the coffee beans are ground. As shown in FIGS. 4 and 5, according to the embodiment of the present invention, since the coffee beans are compressed in the radial direction of the eccentric rollers to be ground, it is advantageous that the coffee beans are ground without blockage of the pores therein.

According to the embodiment of the present invention, the inner blade 200 includes a cutting blade 250 at a lower side thereof. The cutting blade 250 has a circular disc shape of which an outer circumferential surface is inclined outwardly. The rotating shaft hole 230 is formed in a center of the inner blade 200 and assembled to the rotating shaft 510 together with the eccentric rollers 210 and 220 to rotate together.

The cutting blade 250 is concentrically disposed with the rotating shaft 510 and the outer blade 100, and has a corresponding cutting surface 255 corresponding to a cutting surface 155 of the outer blade 100 on the outer circumferential surface thereof. The grinding object ground while passing through the eccentric rollers 210 and 220 is additionally ground while moving downward in an inclination direction along a space between the cutting surface 155 of the outer blade 100 and the corresponding cutting surface 255 of the cutting blade 250.

In the cutting surface 155 formed at a lower side of the inner circumferential surface 111 of the outer blade 100, a surface inclined outwardly in a downward direction is formed in a ring shape, and cutting protrusions are formed on the ring-shaped inclined surface in a spiral direction.

An inclined cutting space portion in which the grinding object is ground by an action of the cutting protrusions formed on the cutting surface 155 and the corresponding cutting surface 255 is formed between the cutting surface 155 and the corresponding cutting surface 255. The coffee beans or the like ground by the eccentric rollers 210 and 220 are additionally ground to a desired particle size while passing through the inclined cutting space portion and then discharged to a lower direction of the grinding blade 10.

According to the embodiment of the present invention, the size of the grinding object, that is, the particle size of the grinding object may be adjusted by adjusting a position of the corresponding cutting surface 255 relative to the cutting surface 155 in a height direction. The cutting space portion between the cutting surface 155 and the corresponding cutting surface 255 extends to be inclined outwardly in a downward direction from a center line of the grinding blade, and when the inner blade 200 is moved in an upward direction, since the cutting space portion becomes narrower, the particle size of the grinding object decreases in comparison with a state before the inner blade 200 moves, and when the inner blade 200 is moved in a downward direction, the cutting space portion becomes broader and thereby the particle size of the grinding object may increase. To this end, according to the embodiment of the present invention, the inner blade 200 may be formed so that a position of the inner blade 200 relative to the outer blade 100 may be adjusted in the height direction.

Hereinafter, a grinder according to an embodiment of the present invention will be described with reference to FIGS. 6 to 8.

A grinder 1 according to the embodiment of the present invention includes the grinding blade 10, a body 30 in which the grinding blade 10 is installed, and a driving part 50. Further, a collecting container 40 configured to collect the grinding object may be coupled to a lower portion of the body 30.

The body 30 has a hollow cylindrical shape. The body 30 includes a lower section 350 in which the grinding blade 10 is installed and an upper section 370 in which the coffee beans input from an upper side are stored to be supplied to the grinding blade 10.

A partition 310 formed to protrude inward along a circumference may be provided at an inner circumferential surface 302 of the body 30. The partition 310 becomes a boundary between the lower section 350 and the upper section 370. A through hole 312 vertically passing through the partition 310 is formed in the partition 310. The coffee beans stored in the upper section 370 move to the grinding blade 10 located in the lower section 350 through the through hole 312. A through hole 315 through which the rotating shaft 510 extends is formed in a center of the partition 310. In the through hole 315, since a bearing is installed, the rotating shaft 510 may be rotatably supported in the through hole 315 through the bearing.

The grinding blade 10 is inserted into the lower section 350 from a lower side of the body 30 and installed in a way so that the outer blade 100 of the grinding blade 10 is fixed to the lower section 350.

In the embodiment, although an example in which the grinding blade 10 is disposed to be partially inserted into the lower section 350 is described, various modifications are possible. The lower section 350 refers to an area in which the grinding blade 10 is supported on the lower portion of the body 30, and does not have to be limited to a space into which the grinding blade 10 is partially inserted like the illustrated embodiment.

Meanwhile, the collecting container 40 may be detachably coupled to the lower side of the body 30 to accommodate the grinding object which is ground by the grinding blade 10 and drops.

The driving part 50 configured to drive the grinding blade 10, and more specifically, the driving part 50 configured to rotate the inner blade 200 relative to the outer blade 100 includes the rotating shaft 510 and a handle 520 detachably coupled to an upper end of the rotating shaft 510. The handle 520 is one example of a driving means configured to drive the rotating shaft 510. The driving means may be an electric device such as a motor or the like.

The rotating shaft 510 extends in a downward direction by passing through the rotating shaft hole 230 of the inner blade 200. A nut member is fastened to a lower end of the rotating shaft 510 to fix the rotating shaft 510 to the inner blade 200.

A height adjusting screw part 304 is formed on the inner circumferential surface 302 of the body 30. A particle size adjusting plate 320 and a fixing plate 330 are coupled to the height adjusting screw part 304. Specifically, a screw thread is formed on an outer circumferential surface of each of the particle size adjusting plate 320 and the fixing plate 330 to be coupled to the height adjusting screw part 304. The height adjusting screw part 304 allows positions of the particle size adjusting plate 320 and the fixing plate 330 to be adjusted in the height direction. The height adjusting screw part 304 is not limited to a case of being formed on the inner circumferential surface 302 of the body 30, and may be formed on an outer circumferential surface of the body 30. Various forms in which positions of the particle size adjusting plate 320 and the fixing plate 330 may be adjusted in the height direction according to the height adjusting screw part 304 may be used.

Referring to FIGS. 6 to 8 again, a through hole 322 may be formed through a surface of the particle size adjusting plate 320 so that the grinding object such as the coffee bean or the like may be introduced into the upper section 370. Further, a through hole 324 through which the rotating shaft 510 extends is formed in a center of the particle size adjusting plate 320, and a bearing 530 such as a bushing bearing or the like may be installed in the through hole 324 to enable the rotating shaft 510 to smoothly rotate relative to the particle size adjusting plate 320.

According to the embodiment of the present invention, a shaft height fixing member 550 is fitted into and fixed to the through hole 324 of the particle size adjusting plate 320 from a lower side of the through hole 324. Since a screw thread is formed on an inner circumferential surface of the through hole 324, and a screw thread is formed on an outer circumferential surface of the shaft height fixing member 550 fitted into the through hole 324 from the lower side of the through hole 324, the shaft height fixing member 550 is screw-fastened to the through hole 324 of the particle size adjusting plate 320 and fixed. A through hole through which the rotating shaft passes is formed in a center portion of the shaft height fixing member 550.

An engaging protrusion 512 is formed to protrude to an outer circumferential side on the upper end of the rotating shaft 510, and when the rotating shaft 510 extends downward through the shaft height fixing member 550, the engaging protrusion 512 is supported on the shaft height fixing member 550 and thus a position of the engaging protrusion 512 in a height direction is determined. When the bearing 530 such as a bushing bearing or the like is used at the rotating shaft 510, the shaft height fixing member 550 performs a function as a bearing housing and thus the bearing 530 is inserted into the shaft height fixing member 550, and the rotating shaft 510 is supported by the shaft height fixing member 550 through the bearing 530. To this end, an engaging protrusion 532 supported on an upper end of the shaft height fixing member 550 is formed on an upper end of the bearing 530, and the engaging protrusion 512 of the rotating shaft 510 is supported on the upper end of the bearing 530.

Figure 6:
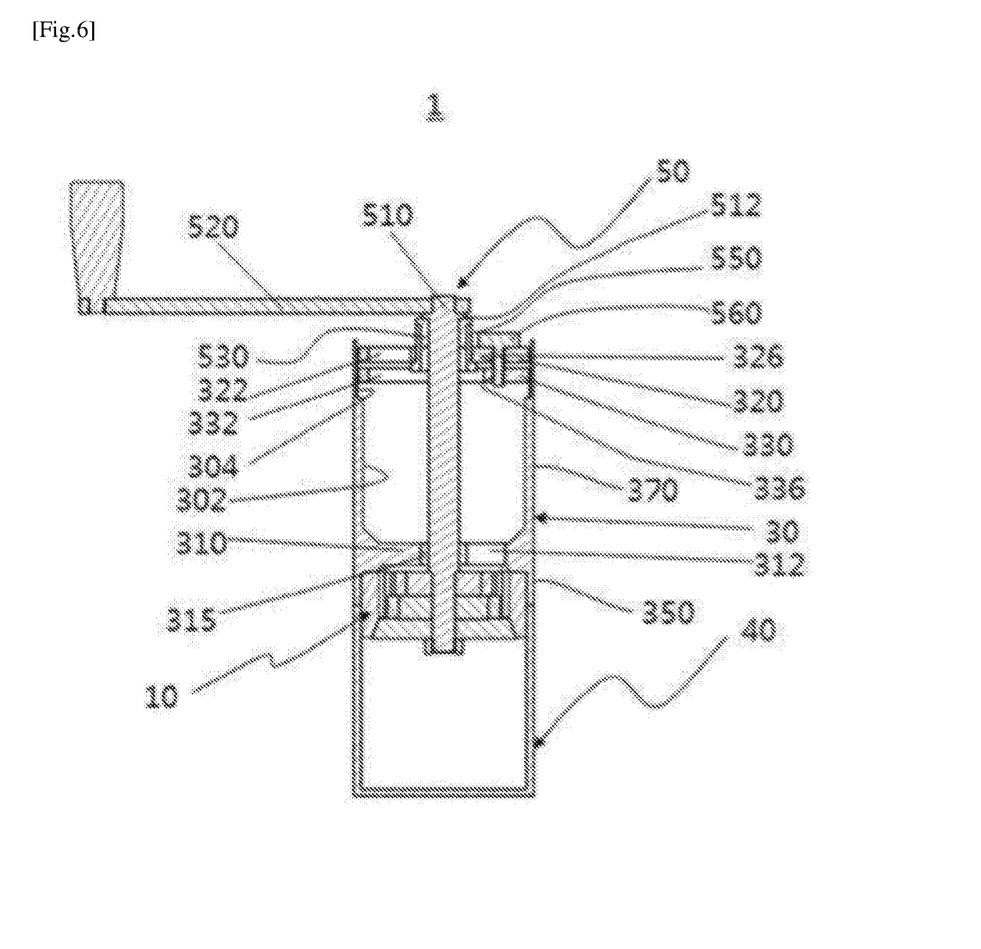
FIG. 6 is an assembly cross-sectional view of a grinder according to the present invention.
Figure 7:
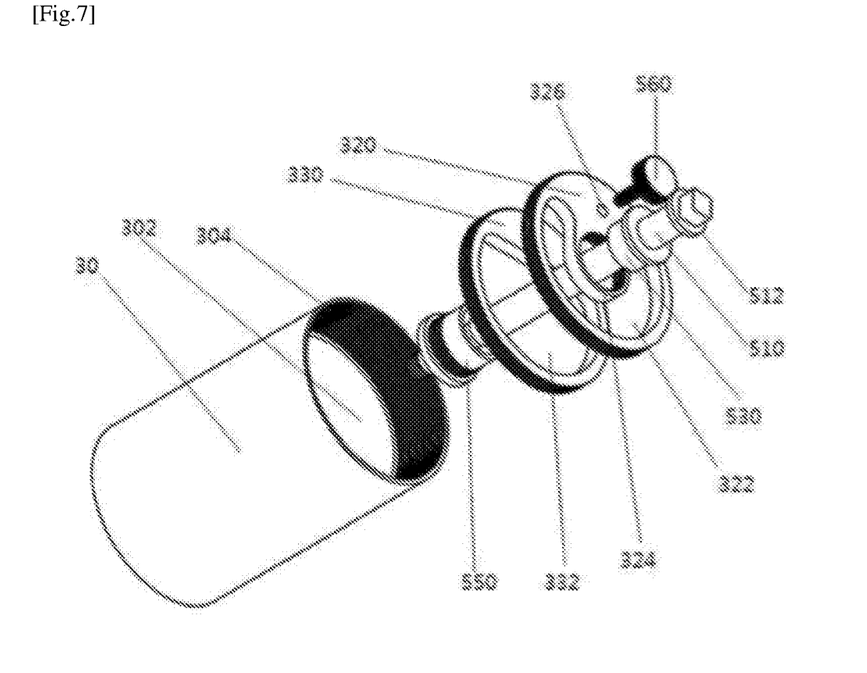
FIG. 7 is a view illustrating some components of the grinder according to the present invention in an exploded perspective view.
Figure 8:
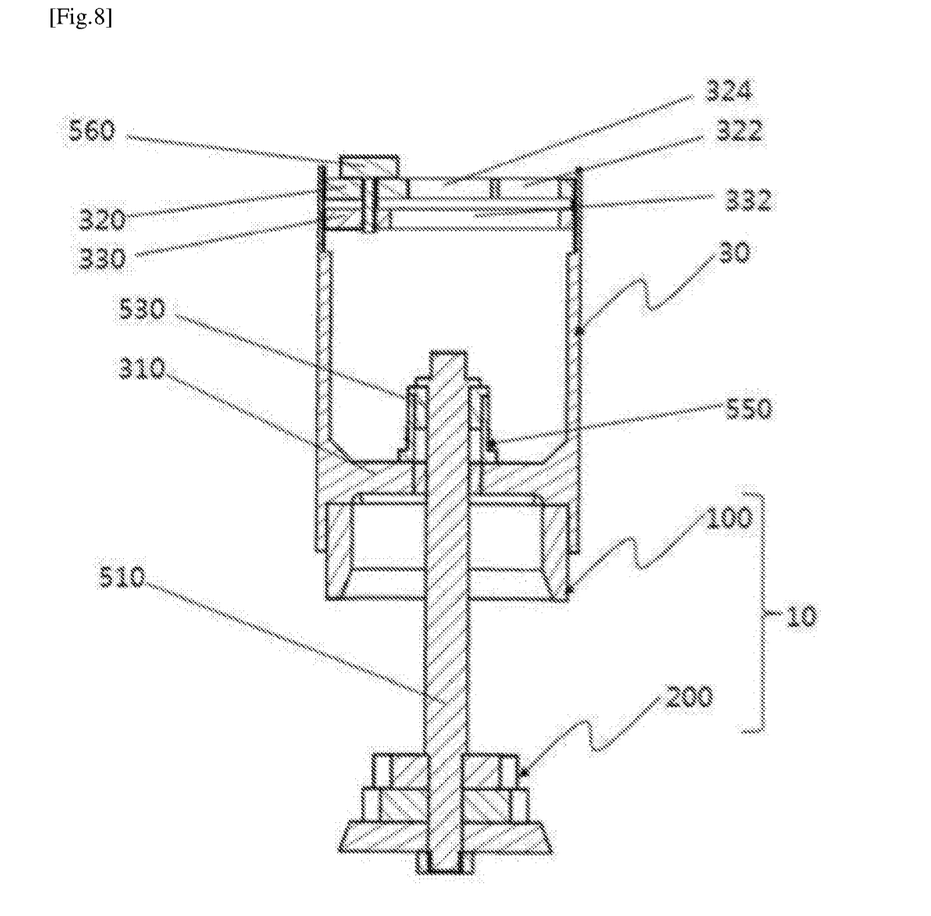
FIG. 8 is an assembly cross-sectional view for describing a process of cleaning the grinding blade in the grinder according to the present invention, and illustrates the grinder in a form in which some components are omitted.

As shown in FIGS. 6 to 8, when the grinding blade needs to be cleaned after grinding the coffee beans or the like, the shaft height fixing member 550 may be separated from the through hole 324 of the particle size adjusting plate 320 after separating the collecting container 40 from the body 30, and separating the handle 520 from the rotating shaft 510. Accordingly, the rotating shaft 510 is separated from the particle size adjusting plate 320 together with the shaft height fixing member 550 to move in a downward direction. The shaft height fixing member 550 descends together with the rotating shaft 510 to a position around the through hole of the partition 310 (see FIG. 8). That is, the rotating shaft 510 descends by a predetermined degree without completely departing the lower side of the body 30 due to the partition 310. Accordingly, since the inner blade 200 fixed to the rotating shaft 510 is separated from the outer blade 100 and descends, the inner blade 200 and the outer blade 100 may be easily cleaned using, for example, a brush or the like.

A screw hole 326 through which the particle size fixing screw 560 passes and is fastened is formed in the particle size adjusting plate 320.

The fixing plate 330 is fastened to the height adjusting screw part 304 at a position under the particle size adjusting plate 320. A through hole 332 is formed through a surface of the fixing plate 330 to allow the coffee beans or the like to be input into the body 30. A screw hole 336 to which the particle size fixing screw 560 is fastened is formed in the fixing plate 330. Accordingly, the particle size fixing screw 560 may be fastened in a state in which the screw hole 326 of the particle size adjusting plate 320 and the screw hole 336 of the fixing plate 330 coincide with each other.

The rotating shaft 510 is supported in the particle size adjusting plate 320 by regulating a position in a height direction mediated through the shaft height fixing member 550. Accordingly, when the particle size adjusting plate 320 is rotated on the basis of the height adjusting screw part 304 and thus a height of the particle size adjusting plate 320 relative to the body 30 is adjusted, in the grinding blade 10, a height of the inner blade 200 relative to the outer blade 100 is adjusted. Since adjustment of the height and position of the inner blade 200 relative to the outer blade 100 relates to a size of the inclined cutting space portion as described above, finally, the particle size of the grinding object, that is, a size of the grinding object may be adjusted.

The fixing plate 330 and the particle size fixing screw 560 are used to fix the particle size adjusting plate 320 to a position at which the particle size is adjusted.

The position of the inner blade 200 relative to the outer blade 100 is adjusted so that the position of the particle size adjusting plate 320 is adjusted and thus the grinding object may be ground at a desired particle size. After that, the fixing plate 330 is rotated, the screw hole 326 of the particle size adjusting plate 320 and the screw hole 336 of the fixing plate 330 coincide with each other, and the particle size fixing screw 560 is fastened to the screw hole 326 and the screw hole 336. When the particle size fixing screw 560 is fastened and tightened, a pressure which moves the particle size adjusting plate 320 and the fixing plate 330 in facing directions is applied, and accordingly, fine position adjustment from which backlash is removed may be performed, and a fixing force correctly located at a predetermined position may be provided. Since the particle size fixing screw 560 may be operated with a small force, a fixing state between the particle size adjusting plate 320 and the fixing plate 330 and a fixing state of the position of the inner blade 200 relative to the outer blade 100 according to the above may be released and adjusted with a small force. For example, when additional position adjustment is necessary to adjust the particle size, when the particle size fixing screw 560 is slightly released in a range in which the particle size fixing screw 560 maintains fastening with the particle size adjusting plate 320 and the fixing plate 330, since the pulling force of each of the particle size adjusting plate 320 and the fixing plate 330 is released, when the particle size adjusting plate 320 is rotated, the fixing plate 330 may also be rotated to adjust the height of the particle size adjusting plate 320, and accordingly, the height of the inner blade 200 is adjusted. After height adjustment is completed, the particle size fixing screw 560 may be tightened again to fix the particle size adjusting plate 320 so that the particle size adjusting plate 320 may not move.

The particle size adjusting plate 320 allows a thickness of the grinding object to be adjusted, and the fixing plate 330 and the particle size fixing screw 560 function to fix with adjusted and fixed thicknesses.

According to the present invention, the particle size adjusting configuration of the above-described grinding object is particularly advantageous for being operated separately with a configuration that separates the inner blade 200 from the outer blade 100 to clean the grinding blade 10. That is, the particle size fixing screw 560 does not have to be released even when the rotating shaft 510 is separated to a lower side on the basis of the particle size adjusting plate 320 to clean the grinding blade 10. Further, after cleaning, when the inner blade 200 and the rotating shaft 510 are lifted and then the rotating shaft 510 is fixed again on the basis of the particle size adjusting plate 320, since the inner blade 200 returns to an original position at which the particle size is adjusted, a state in which the particle size is adjusted is maintained. That is, the apparatus does not have to be operated again so that the particle size of the grinding object becomes a desired size after the cleaning. Accordingly, a uniform particle size of the grinding object may be stably obtained.

In the specification, the vertical roller-type grinding blade and the grinder including the same according to the present invention are described as an example of the coffee bean grinder configured to grind coffee beans, but are not limited thereto, and may be used to grind various objects to be ground.

The invention claimed is:

1. A system for a vertical roller grinding blade comprising:
   an outer blade having a hollow hole formed therein; and
   an inner blade including at least two eccentric rollers configured in the hollow hole of the outer blade to be rotated by a rotating shaft, each of the at least two eccentric rollers being eccentrically configured so that a center line and a rotation axis are misaligned with each other,
   wherein the at least two eccentric rollers are eccentrically disposed to each other so that center lines of the at least two eccentric rollers are misaligned with each other.

2. The system for the vertical roller grinding blade of claim 1, wherein:

the at least two eccentric rollers include a first eccentric roller located at an upper side and a second eccentric roller located at a lower side of the first eccentric roller; and a portion having a greatest interval between an outer circumferential surface of the second eccentric roller and an inner circumferential surface of the hollow hole is formed to be wider than a portion having a smallest interval between an outer circumferential surface of the first eccentric roller and the inner circumferential surface of the hollow hole.

3. The system for the vertical roller grinding blade of claim 2, wherein the second eccentric roller, which is configured at a lower side among the at least two eccentric rollers, is formed to have a diameter greater than or equal to that of the first eccentric roller located at the upper side.

4. The system for the vertical roller grinding blade of claim 1, wherein:
   each of the at least two eccentric rollers includes a bearing part configured to rotate together with the rotating shaft, and a ring part rotatably supported on the bearing part; and
   an interval between an outer circumferential surface of the ring part and an inner circumferential surface of the hollow hole of the outer blade is variable while the ring part maintains a non-rotating state when the bearing part rotates.

5. The system for the vertical roller grinding blade of claim 4, wherein a slip prevention part is formed in at least one of an outer circumferential surface of at least one of the at least two eccentric rollers and the inner circumferential surface of the hollow hole.

6. The system for the vertical roller grinding blade of claim 5, wherein the slip prevention part is a slip prevention groove formed in a direction which crosses a radial direction in the outer circumferential surface of the at least one of the at least two eccentric rollers or the inner circumferential surface of the hollow hole.

7. The system for the vertical roller grinding blade of claim 1, wherein:
   the outer blade includes a cutting surface in which a cutting protrusion is formed on an inclined surface thereof which extends downward to be inclined in an outward direction at a lower end of an inner circumferential surface of the hollow hole; and
   the inner blade includes a corresponding cutting surface on which a cutting protrusion is formed to correspond to the cutting surface in an outer circumferential surface under the at least two eccentric rollers and further includes a cutting blade in which a center line and a rotation axis are correspondingly installed.

8. A grinder comprising:
a hollow body in which the system for the vertical roller grinding blade according to claim 7 is configured;
a driving part including the rotating shaft coupled to the inner blade to extend upward from the body and a driving means configured to rotate the rotating shaft;
a particle size adjusting plate rotatably coupled to a height adjusting screw part formed at an upper portion of the body, and in which the rotating shaft passes therethrough and is supported in a height direction to adjust a height of each of the rotating shaft and the inner blade fixed to the rotating shaft, and screw holes are formed in a surface thereof;
a fixing plate rotatably coupled to the height adjusting screw part, and having screw holes corresponding to the screw holes of the particle size adjusting plate in a surface thereof; and
particle size fixing screws fastened through the screw holes in a state in which the screw holes of the particle size adjusting plate and the screw holes of the fixing plate correspond to each other to press the particle size adjusting plate and the fixing plate so that the particle size adjusting plate and the fixing plate receive forces in facing directions.

9. A grinder comprising:
a hollow body on which the system for the vertical roller grinding blade according to claim 7 is configured at a lower portion;
a driving part including the rotating shaft coupled to the inner blade to extend upward from the body and a driving means configured to rotate the rotating shaft;
a particle size adjusting plate rotatably coupled to a height adjusting screw part formed at an upper portion of the body, and configured to adjust a height of the inner blade coupled to the rotating shaft by rotating along the height adjusting screw part as the rotating shaft is supported in a height direction; and
a shaft height fixing member fitted into a through hole formed in a center portion of the particle size adjusting plate in a downward direction to be detachably fixed, and in which the rotating shaft passes therethrough and is supported in the height direction to regulate a height of the rotating shaft.

10. The grinder of claim 9, wherein:
an inner circumferential surface of the body is further provided with a partition configured to protrude inward along a circumference thereof, and thus an inner space of the body is divided into an upper section on the partition in which a grinding object is introduced and stored, and a lower section under the partition on which the outer blade of the grinding blade is supported;
a through hole configured to allow the grinding object to move and a through hole formed in the center portion so that the rotating shaft extends therethrough are formed in the partition; and
a descending range of the shaft height fixing member and the rotating shaft to which the inner blade is fixed is regulated by the partition around the through hole when the shaft height fixing member is separated from the particle size adjusting plate and descends.

\* \* \* \* \*